United States Patent [19]

Yasuhara et al.

[11] Patent Number: 4,533,946
[45] Date of Patent: Aug. 6, 1985

[54] DIAGNOSTIC X-RAY APPARATUS

[75] Inventors: Hiroshi Yasuhara; Hitoshi Fujita; Kiyoshi Okazaki, all of Ootawara, Japan

[73] Assignee: Tokyo Shibaura Denki Kabushiki Kaisha, Kawasaki, Japan

[21] Appl. No.: 463,003

[22] Filed: Feb. 1, 1983

[30] Foreign Application Priority Data

Mar. 9, 1982 [JP] Japan .................................. 57-35848

[51] Int. Cl.³ .............................................. H06N 7/18
[52] U.S. Cl. .................................... 358/111; 128/654; 364/414; 378/99
[58] Field of Search ........................ 358/111; 364/414; 378/99; 128/653, 654, 659

[56] References Cited

U.S. PATENT DOCUMENTS

| 4,204,225 | 5/1980 | Mistretta .............................. | 358/111 |
| 4,204,226 | 5/1980 | Mistretta et al. ..................... | 358/111 |
| 4,458,267 | 7/1984 | Dolazza .............................. | 358/111 |
| 4,468,696 | 8/1984 | Stone ................................. | 358/111 |

OTHER PUBLICATIONS

*Conference Proceedings of Society of Photo-Optical Instrumentation Engineers*, vol. 127, Application of Optical Instrumentation in Medicine VI, Boston, Mass., USA (25-27 Sep. 1977) pp. 208-215.

Toshiba Review, International Edition, Sep. 1973, No. 85, T. Tsuneoka et al, "X-Ray Examination Dose Reduction System".

Toshiba Review, International Edition, Jul.-Aug. 1969, No. 43, M. Nakashika et al, "Latest Diagnostic System for Circulatory Organs".

*Primary Examiner*—Howard W. Britton
*Attorney, Agent, or Firm*—Oblon, Fisher, Spivak, McClelland & Maier

[57] ABSTRACT

A diagnostic X-ray apparatus emitting a pulsed X-ray radiation and including a processor for performing digital X-ray subtraction imaging which includes digitization of the video signals from an image intensifier—TV chain, digital subtraction and reconversion of the resultant digital difference video signals to analog signals, wherein the subtraction is performed for selected television images by ignoring a predetermined number of preceding television images in a predetermined image sequence.

2 Claims, 6 Drawing Figures

DIAGNOSTIC X-RAY APPARATUS

BACKGROUND OF THE INVENTION

1. Field of the Invention

This invention relates to a diagnostic X-ray apparatus using digital X-ray subtraction imaging techniques including digitization of the video signals from an image intensifier—TV chain, digital subtraction, contour enhancement and reconversion to analog signals for viewing in real time on a monitor.

2. Description of the Prior Art

The digital X-ray subtraction imaging technique using the imaging intensifier—TV chain was developed and firstly described by Mistretta et al. For example, U.S. Pat. Nos. 4,204,225 and 4,204,226 respectively issued to Mistretta and Mistretta et al disclose realtime digital X-ray subtraction imaging methods and apparata which employ the so-called Digital Radiography or Digital fluoroscopy technology. These digital X-ray subtraction imaging apparata consist of an image intensifier, a TV camera whose output is converted into digital format, and an image processor incorporating two digital memories.

As disclosed in U.S. Pat. No. 4,204,225, in carrying out the mask mode, a first memory system is preferably employed to integrate and store the digital mask video signals by digitization of the video signals from an image intensifier—TV chain during an initial mask time interval corresponding to a relatively large number of television fields, and a second memory system is employed to perform the functions of integrating the ongoing digital video signals and providing an output of the previously integrated video signals, from which the mask video signals from the first memory system are subtracted. The resulting digital difference video signals are supplied to a D/A convertor which provides corresponding analog difference video signals for display by the television display device, and are alternatively connected to a multiformat camera for making a selected number of radiographic exposures on a single film.

In the time interval difference mode disclosed in U.S. Pat. No. 4,204,226, a continuous series of difference images are produced by integrating digital video signals over a series of successive time intervals, performing a series of subtractions between each set of video signals integrated by each memory system and the preceding set to produce a series of successive digital difference video signals, and converting such digital difference video signals into visible television difference images representing changes in the X-ray image between the successive time intervals.

One advantage of a digital radiography apparatus is its capability to perform angiography by means of intravenous injection thereby supplanting intraarterial catheter techniques considered too risky to be used. Another advantage of the digital radiography apparatus is its capability to provide improved low contrast detectability, namely, by amplifying subtle amounts of contrast media in arteries better than possible using film methods. A further advantage is that the digital radiography apparatus employing a pulsed X-ray can prevent significant loss of spatial resolution due to physiological motion because the short radiation pulse for each image results in less motion unsharpness during fluoroscopy of moving objects.

However, in these digital radiography apparata the use of subtraction of different TV frames read out in an interlaced manner by a TV camera is affected by characteristics of the TV camera. In general, the TV camera using a pick up tube, such as the vidicon, has persistance characteristics shown in FIGS. 1a and 1b. The curve of FIG. 1a illustrates the relationship between rise time (after a step charge in target illumination) and relative signal output, and the curve of FIG. 1b illustrates the relationship beteeen decay time (after a step charge in target illumination) and relative signal output.

Therefore, this lag causes a difference in signal level between signals read out during a pulsed X-ray exposure and signals read out during the following pulsed X-ray exposure. For each television frame, it is necessary to maintain consistent image signal level and image information so as to remove or suppress effects by uninteresting soft tissue, bone, or air filled structures that overly and underly the structures of interest in the subtraction operation.

SUMMARY OF THE INVENTION

Accordingly, the objects of the present invention are generally to overcome the above defects of the prior art pulsed digital radiography apparatus using an imaging intensifier—TV chain, to provide new features of maintaining consistent image signal level and image information for each television frame, and to minimize significant loss of spatial resolution due to physiological motion.

Still another object of this invention is to decrease the influence of persistance characteristics in a TV camera tube, which causes a difference in video signal level of each image frame.

Another object of the invention is to provide a pulsed digital radiography apparatus which integrates and stores the digital video signals by digitization of the desired video signals from an image intensifier—TV chain, and which uses a unique data processor for writing the desired video signals into memories selectively in response to an output from a control unit.

These and other objects are achieved according to the invention by providing a novel diagnostic X-ray apparatus emitting a pulsed X-ray radiation, which incudes a processor for performing digital X-ray subtraction imaging including digitization of the video signals from an image intensifier—TV chain, digital subtraction, and reconversion of the resultant digital difference video signals to analog signals, wherein the subtraction is performed for selected television images by ignoring a predetermined number of preceding television images in a predetermined image sequence.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1A:
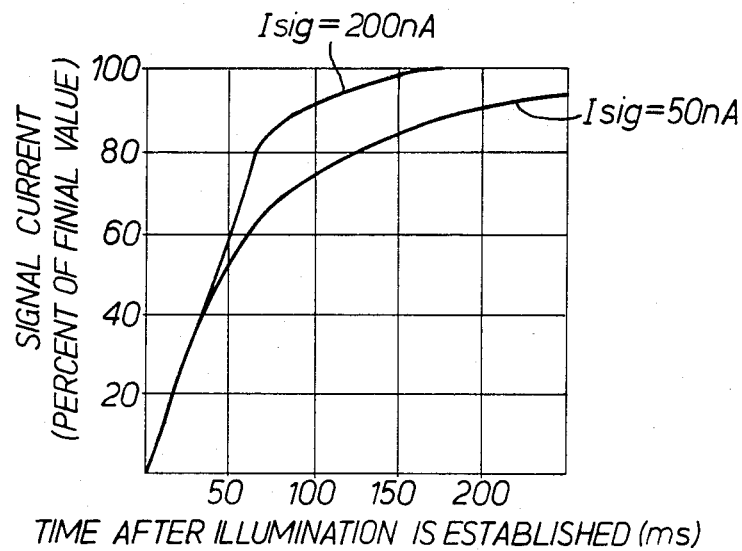
FIGS. 1a and 1b are graphs illustrating the persistance characteristics of a TV pick up tube.
Figure 1B:
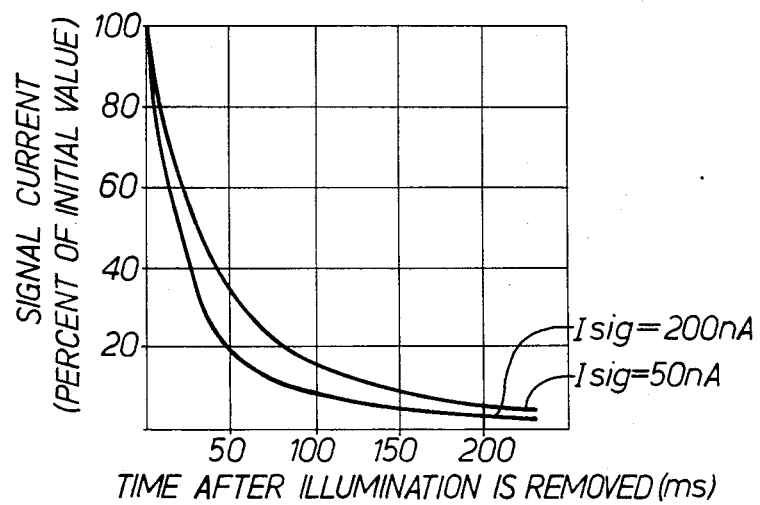
Figure 2:
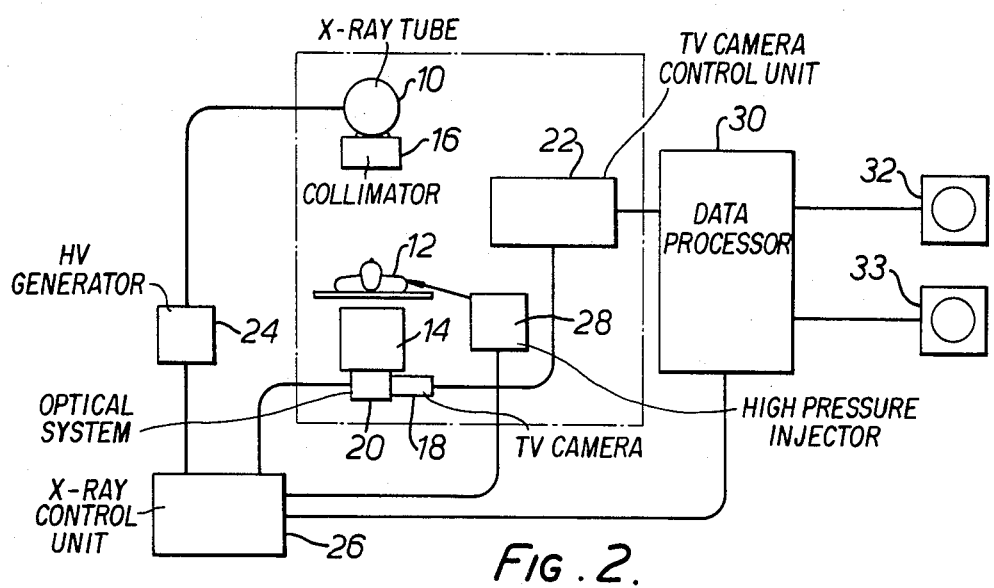
FIG. 2 is a schematic block diagram of a preferred embodiment of a diagnostic X-ray apparatus using a digital X-ray subtraction imaging technique in accordance with the present invention.

Referring now to the drawings, wherein like reference numerals designate identical or corresponding parts throughout the several views, and more particularly to FIG. 2 thereof, FIG. 2 is a block diagram of the improved diagnostic X-ray apparatus using digital X-ray subtraction imaging technique in accordance with the present invention. In FIG. 2, an X-ray tube 10 having a conventional filament and an anode produces X-rays which impinge upon a patient 12, thus casting a shadow image of the patient on an input to an image intensifier tube 14. A servo controlled collimator 16 along with a collimator servo system (not shown) disposed at one end of the X-ray tube 10 is utilized to control the size of the X-ray beam that is emitted from the X-ray tube 10. The intensifier 14 intensifies the X-ray image and produces a corresponding optical image on the output screen of the intensifier 14. This image is scanned by a TV camera 18, via optical system 20 including an object lens, a field lens (not shown) and an auto iris for adjusting the quantity of light from the intensifier 14 (not shown), under the control of a TV camera control unit 22 to produce corresponding video signals on an output of the unit 22. A high-voltage generator 24 provides high voltage to energize the X-ray tube 10 under control of an X-ray control unit 26.

The X-ray control unit 26 may energize the X-ray tube 10 to radiate pulsed X-rays either by a method using a thyristor switching system or a method using a tetrode switching system.

These methods have previously been described in Nakashima et al., *Toshiba Review International Edition*, July–Aug., No. 43, 1969, pp. 24–29.

A contrast medium is preferably injected into the right basilic vein of the patient 12 using a high-pressure injector 28 at a flow rate of 12 cc/s under control of the X-ray control unit 26. A data processor 30 for carrying out digitization of the video signals from the TV camera, digital subtraction, contour enhancement, and reconversion to analog signals is connected to the TV camera control unit 22, which amplifies and processes the analog video signals and from which amplified analog video signals are delivered along an analog video input line. The X-ray control unit 26 is also connected to the data processor 30, which provides the television synchronizing pulses for the X-ray control unit 26 to synchronize the operation of the X-ray control unit 26 with the television fields. The data processor 30 supplies the resulting analog difference video signals for display by the television display devices 32, 33.

Figure 3:
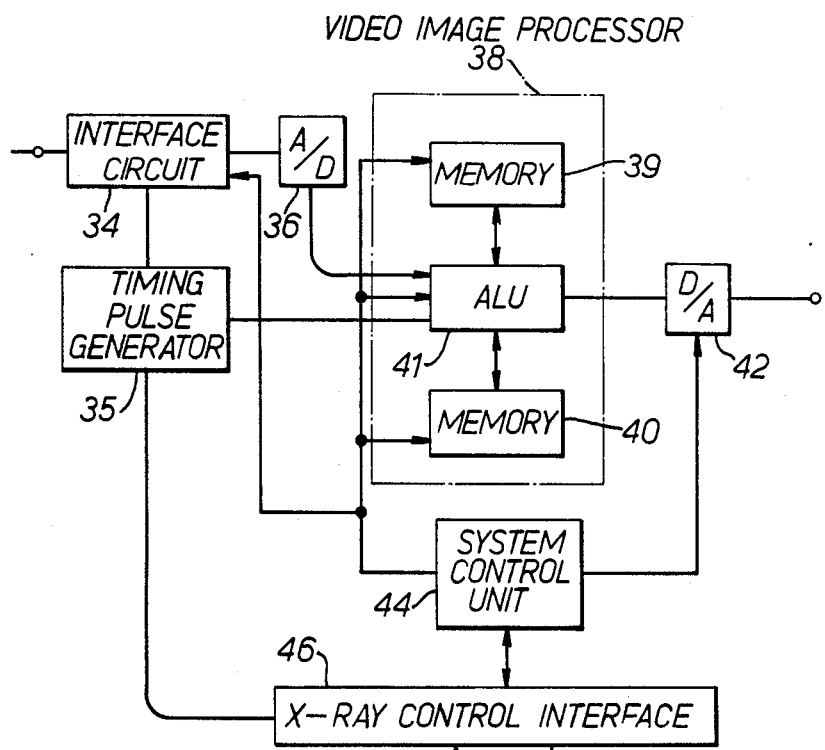
FIG. 3 is a schematic block diagram of a data processor for association with the X-ray exposure control unit and the TV camera control unit of FIG. 2.

Attention is now directed to FIG. 3 which shows details of the data processor 30 shown in FIG. 2.

The data processor 30 includes an interface circuit 34 including a separator for separating field synchronizing pulses at rate of 1/60 second per field from composite video signals which are provided from the TV camera control unit 22. In addition to the separator, the interface circuit 34 includes a gate circuit. Data processor 30 futher includes a timing pulse generator 35 for producing timing pulses at rate of 1/30 sec (33 msec) in accordance with one television frame consisting of two individual fields, an analog-to-digital convertor 36 for converting analog video signals into corresponding digital video signals, a video image processor 38 including two memory systems 39, 40 for integrating and storing the digital video signals over a series of successive time intervals, and an arithmetic logic unit 41 for enabling the memories 39, 40 to integrate and store the digital video signals over a series of successive time intervals, and producing digital difference video signals by performing a subtraction either between the two sets of integrated digital video signals stored in the most recently filled memory system 40 and the previously filled memory system 39 during the time interval when the other memory system 40 is being filled, which operates in response to command signals initiated by timing pulse generator 35. Data processor 30 further includes a digital-to-analog convertor 42 for converting the digital difference video signals into analog difference video signals, a system cntrol unit 44 containing a $\mu$-cpu for providing all of the control, timing and synchronizing pulses and signals for the entire system, an X-ray control interface 46 serving as a controller for the X-ray control unit 26, from which X-ray radiation pulses are delivered. Interface 46 is also coupled to system control unit 44, and further receives timing pulses from timing pulse generator 35.

The $\mu$-cpu of the system control unit 44 is programmed to perform a digital X-ray subtraction imaging operation in a predetermined sequence in response to command signals, such as the mask time interval To, and the waiting interval ET, and the image acquisition rate PR selected corresponding approximately to the frame rate, initiated from an operator console (not shown).

The operation of the apparatus according to the present invention will be now explained with reference to FIGS. 3, 4 and 5.

Figure 4:
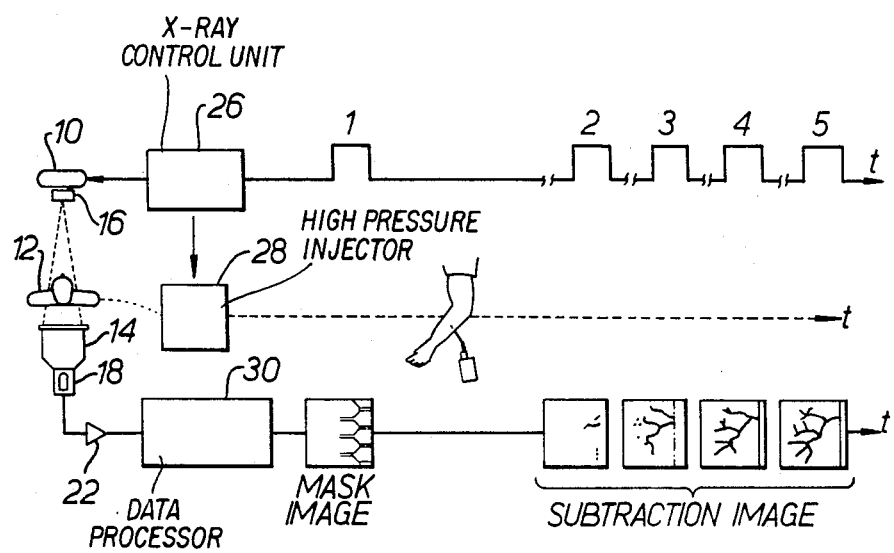
FIG. 4 is an illustration of the circuit principle for the digital X-ray subtraction imaging technique using a pulsed X-ray in accordance with the present invention.

FIG. 4 represents a method that is the so-called mask mode, in which a continuous series of difference images are produced by developing a preinjection mask image, prior to the injection of the contrast medium and electronically subtracting the mask image from each of a series of post-injection images. This mask subtraction mode removes effects due to soft tissue, bone or air filled structures, so that the image elements due to the contrast medium are clearly visible in the subtracted images. An alternative method offered by the subtraction technique is the use of the Time Interval Difference method, in which each set of the integrated digital images is used as a mask for the following integrated digital images, which is particularly well-adapted for visualizing the progress of a contrast medium injected into a peripheral portion of the cardiovascular system.

In the mask shown in FIG. 4, the X-ray control unit 26 provides the X-ray exposure pulses synchronized with television frames to the high-voltage generator 24 in response to the timing signal, as an X-ray exposure trigger signal, generated by the system control unit 44. These X-ray exposure pulses energize the high-voltage generator 24 to produce pulsed X-rays instantly on command at selected programmed time intervals corresponding to eight television frames.

The high-voltage generator 24 includes a switching device turned on and off by a 100 msec pulse from the X-ray control unit 26. For each X-ray exposure, the TV camera 18 will produce three complete difference images, which are transmitted to the data processor 30. The analog video signals from the TV camera control unit 22 are gated, sampled and held on command of the system control unit 44 in the interface circuit 34, which is based on a predetermined mask time interval TO from an operator console (not shown).

Figure 5:
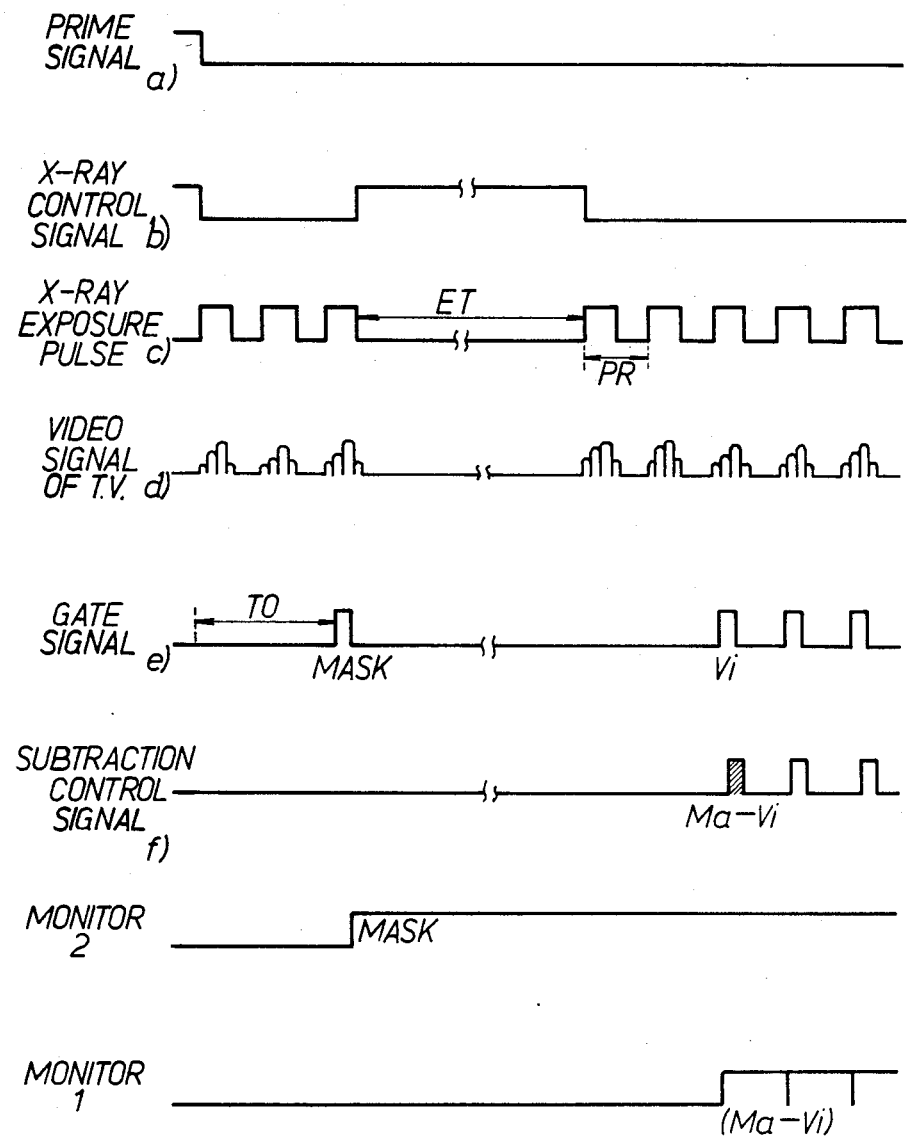
FIG. 5 is a waveform diagram, which illustrates various waveforms at various parts of the controlling unit, explaining the principle of the present invention.

As shown in FIG. 5, the later complete frame of three television frames produced by the third pulsed X-ray exposure is introduced to the analog-to-digital convertor 36, so that the output of the interface circuit 34 is at a sufficiently high level. The analog-to-digital convertor 36 applies corresponding digital video signals via the arithmetic logic unit 41 to a mask producing memory system 39 where a plain image serving as a mask for the subtraction is made before injection of the contrast medium. During the next some television frames corresponding to the waiting interval ET, such as 1-30 sec, the X-rays are not radiated from the X-ray tube 10, and the new digital video signals are not admitted into the data processor 30. On the other hand, an X-ray contrast medium is injected into the vein in the arms or legs of the patient 12 using the injector 28 with a timing such that the contrast medium becomes operative during the time interval ET. After the waiting intervals, here again, the X-ray tube 10 will be energized by the high-voltage generator 24 to produce pulsed X-rays at the programmed rate in response to the image acquisition rate PR initiated from the system control unit 44. The system control unit 44 then causes the second memory system 40 to integrate and store the incoming digital video signals at a sufficiently high level over time intervals on the order of three television frames selected in each exposure by ignoring the first few frames of the preceding two pulsed X-ray exposures.

Alternately, the mask image in the first memory system 39 is subtracted by the arithmetic logic unit 41 from the integrated subsequent video signals from the second memory system 40.

The digital difference video signals from the output of the arithmetic logic unit 41 are supplied to the digital-to-analog convertor 42, which converts the digital difference video signals into analog difference video signals. If desired, the digital difference video signals are supplied to an enhancement circuit (not shown), which enhances the selected level of the television scale in the input digital video signals. The analog difference video signals are transmitted to the television monitor 32. Thus, the television monitor 32 produces a continuous series of visible difference images, representing the difference between the current X-ray image and the mask X-ray image. In addition to the television monitor 32, the television monitor 32 displays the mask image from the first memory system 39 continuously for reference. In fact it has been found to be highly advantageous to integrate the mask video signals for a large number of television frames.

As previously indicated, the digital memory has a storage capacity for at least one complete television field, such as a storage capacity of 512 × 512 × 13.

The pulse-width for exposing the pulsed X-ray is preferably on the order of at least three complete television frames.

Further, the ignored exposures are selected without both patients and personnel being subject to excessive radiation.

Obviously, numerous modifications and variations of the present invention are possible in light of the above teachings. It is therefore to be understood that within the scope of the appended claims, the invention may be practiced otherwise than as specifically described herein.

What is claimed as new and desired to be seucred by letters patent of the United States is:

1. A diagnostic X-ray apparatus for producing visible difference images from pulsed X-ray images obtained from pulsed X-radiation, comprising:
   an X-ray generating source for emitting pulsed X-radiation having a pulse duration at least on the order of three television images to produce a pulsed X-ray image;
   television means including a television camera for converting said X-ray image into a series of video signals;
   synchronizing generating means for generating vertical framing signals at a vertical frame rate of said television camera;
   exposure control means responsive to said vertical framing signals for generating X-ray exposure control signals to control the exposure time of X-radiation emitted from said X-ray generating source;
   sequence control means including an analog-to-digital convertor for causing analog video signals corresponding to the last complete television image of said series of television images produced by an X-ray pulse to be converted into corresponding digital video signals by means of the analog-to-digital convertor by ignoring the successive television images preceding said selected television image, and the successive television images at least amounting to six television images after the first pulsed X-ray exposure;
   a digital memory system including at least two digital memory means for storing and integrating said digital video signals in said predetermined sequence;
   subtracting means for producing digital difference video signals by performing a subtraction between digital video signals recently stored in said digital memory system and preceding digital video signals previously stored in said digital memory system;
   a digital-to-analog convertor for converting said digital difference video signals into analog difference video signals; and,
   a television display means for producing visible difference images corresponding to said analog difference video signals.

2. A diagnostic X-ray apparatus for producing visible difference images from pulsed X-ray images obtained from pulsed X-radiation, comprising:
   an X-ray generating source for emitting pulsed X-radiation to produce a pulsed X-ray image;
   television means including a television camera for converting said X-ray image into a series of video signals;
   synchronizing generating means for generating vertical framing signals at a vertical frame rate of said television camera;
   exposure control means responsive to said vertical framing signals for generating X-ray exposure control signals to control the exposure time of the X-radiation emitted from said X-ray generating source;
   sequence control means including an analog-to-digital convertor for causing selected analog video signals corresponding to a later complete television image and which are at a sufficiently high level after a new pulsed X-ray exposure to be converted into corresponding digital video signals by means of the analog-to-digital convertor by ignoring the successive television images preceding said selected television image;

a digital memory system including at least two digital memory means for storing and integrating said digital video signals in a predetermined sequence;

subtracting means for producing digital difference video signals by performing a subtraction between digital video signals recently stored in said digital memory system and preceding digital video signals previously stored in said digital memory system;

a digital-to-analog convertor for converting said digital difference video signals into analog difference video signals; and, a television display means for producing visible difference images corresponding to said analog difference signals.

* * * * *